UNITED STATES PATENT OFFICE.

IGNAZ KREIDL, OF VIENNA, AUSTRIA-HUNGARY.

PROCESS OF MANUFACTURING OPAQUING AGENTS FOR WHITE ENAMEL.

1,123,760.
Specification of Letters Patent. Patented Jan. 5, 1915.

No Drawing. Application filed May 29, 1912. Serial No. 700,396.

*To all whom it may concern:*

Be it known that I, Dr. IGNAZ KREIDL, partner of the firm Vereinigte Chemische Fabriken, Landau, Kreidl, Heller & Co., of Kohlgasse 5-9, Vienna, XXI, Austria-Hungary, a subject of the Emperor of Austria-Hungary, residing at Vienna, XXI, Kohlgasse 5-9, in the Empire of Austria-Hungary, have invented a new and useful Process of Manufacturing Opaquing Agents for White Enamel, of which the following is a specification.

The invention relates to a process for manufacturing opaquing agents for enamels.

The present invention has for its object an improved process for the production of a voluminous silica containing compound of zirconium for rendering enamel and similar vitreous masses opaque. According to the invention this voluminous product is obtained from a zirconium compound containing no silicic acid, for example zirconium oxid (zirconia) and silicic acid or compounds thereof. According to the invention this product is formed by combining silica or a compound thereof with a zirconium compound free from silica in the presence of an alkaline agent and removing the combined alkali.

A suitable method for the preparation of the clouding agent to be employed in the preparation of white enamel according to the present invention is given below by way of example.

Zirconium oxid is mixed with silicic acid in equal molecular proportions or less and the mixture heated with caustic alkali, alkali carbonates or the like. When the temperature is maintained somewhat above red heat, a small excess of alkali is sufficient, for example a mixture in the proportions by weight one part of zirconium oxid plus silica, to one part of alkali. If the temperature is kept somewhat below red heat a greater excess of alkali must be used, the proportions by weight of zirconium oxid plus silica to alkali being say 1:3 or 1:4.

The reaction product is free from the partly formed soluble silicates by treatment with water and the combined alkali is removed by treatment with weak acid. After removal of the solution and drying and if necessary glowing, a voluminous silicious product remains which is particularly suitable as a clouding agent in the manufacture of white enamel.

In the preparation of opaque enamel the improved clouding agent is added in the required proportions and in the usual manner to the already melted and ground enamel mass.

Having now particularly described and ascertained the nature of my invention and in what manner the same is to be performed, I declare that what I claim is:

1. An improved process for the production of a clouding agent for the preparation of white enamel consisting of a silica containing zirconium compound free from combined alkali, the said compound being formed by heating silicious matter with a zirconium compound free from silicious matter in the presence of an alkaline agent, and freeing the formed silica-containing zirconium compound from combined alkali.

2. An improved process for producing a voluminous silica-containing zirconium compound for clouding enamel, comprising heating a mixture of silicious matter and a zirconium compound free from silicic acid in the presence of an alkaline agent, and freeing the reaction product from the thus formed alkali-metal silicates and combined alkali.

3. An improved process for producing a voluminous silica-containing zirconium compound for clouding enamel, comprising heating a mixture of a zirconium compound free from silicic acid and not more than an equal quantity of silicious matter in the presence of an alkaline agent, and freeing the reaction product from the thus formed alkali-metal silicates and combined alkali.

4. An improved process for producing a voluminous silica-containing zirconium compound for clouding enamel, comprising heating a mixture of silicic acid and a zirconium compound free from silicic acid in the presence of an alkaline agent, and freeing the reaction product from the formed alkali-metal silicates and combined alkali.

5. An improved process for producing a voluminous silica-containing zirconium compound for clouding enamel, comprising heating a mixture of a silicic acid compound and a zirconium compound free from silicic acid in the presence of an alkaline agent, and freeing the reaction product from the thus formed alkali-metal silicates and combined alkali.

6. An improved process for producing a voluminous silica-containing zirconium compound for clouding enamel, comprising heating a mixture of zirconium oxid and silicious matter in the presence of an alkaline agent, and freeing the reaction product from the thus formed alkali-metal silicates and combined alkali.

7. An improved process for producing a voluminous silica-containing zirconium compound for clouding enamel, comprising heating a mixture of silicic acid and zirconium oxid, in the presence of an alkaline agent, and freeing the reaction products from the thus formed alkali-metal silicates and combined alkali.

In witness whereof, I have hereunto signed my name in the presence of two subscribing witnesses.

Dr. IGNAZ KREIDL.

Witnesses:
 Hugo Keik,
 August Fugger.